United States Patent [19]
Wootton et al.

[11] Patent Number: 5,434,668
[45] Date of Patent: Jul. 18, 1995

[54] LASER VIBROMETER IDENTIFICATION FRIEND-OR-FOE (IFF) SYSTEM

[75] Inventors: John R. Wootton; Gary Waldman, both of St. Louis County; Gregory L. Hobson; David Holder, both of St. Charles County, all of Mo.

[73] Assignee: Electronics & Space Corp., St. Louis, Mo.

[21] Appl. No.: 861,515

[22] Filed: Apr. 1, 1992

[51] Int. Cl.⁶ .................. G01B 9/02; G01N 21/41
[52] U.S. Cl. .................. 356/345; 73/655; 73/657; 73/659; 359/168; 359/169; 359/170
[58] Field of Search .................. 356/345, 357, 4, 5, 356/358; 342/45; 73/655, 657, 659; 359/170, 169, 168; 250/201.9

[56] References Cited
U.S. PATENT DOCUMENTS

| | | |
|---|---|---|
| 3,150,363 | 9/1964 | Finvold . |
| 3,514,776 | 5/1970 | Mulready . |
| 3,879,988 | 4/1975 | Jacobs ............... 73/657 X |
| 4,209,689 | 6/1980 | Linford et al. ........... 359/169 X |
| 4,361,911 | 11/1982 | Buser et al. ........... 359/170 X |
| 4,379,633 | 4/1983 | Bickel et al. ........... 356/359 |
| 4,393,517 | 7/1983 | Buser et al. ........... 359/170 X |
| 4,554,836 | 11/1985 | Rudd ........... 73/657 |
| 4,635,299 | 1/1987 | MacGovern . |
| 4,763,361 | 8/1988 | Honeycutt et al. ........... 342/45 X |
| 4,777,825 | 10/1988 | Barr et al. ........... 73/657 |
| 4,966,459 | 10/1990 | Monchalin ........... 356/358 |
| 5,001,488 | 3/1991 | Joguet ........... 342/45 |
| 5,048,964 | 9/1991 | Tyrer et al. ........... 73/657 X |
| 5,130,713 | 7/1992 | Wagner ........... 342/45 |
| 5,142,288 | 8/1992 | Cleveland ........... 342/45 |
| 5,170,168 | 12/1992 | Roth ........... 342/45 |

OTHER PUBLICATIONS

Serbyn et al, Measurement of the Phase of Vibrational Displacement by a Laser Interferometer Feb. 4, 1969, The Journal of the Acoustical Society of America, vol. 46, No. 1, pp. 2–5.

Müller et al, A Michelson interferometer for Wavelength Comparisons, Oct. 19, 1979, J. Phys. E: Sci. Instrum, vol. 13, pp. 1024–1027.

Palma et al, Applied Optics, vol. 18, #17, 1 Sep. 1979, p. 3057.

Primary Examiner—Stephen C. Buczinski
Attorney, Agent, or Firm—Polster, Lieder, Woodruff & Lucchesi

[57] ABSTRACT

A friend-or-foe (IFF) identification system (10) comprises a laser generator (12) for generating and transmitting a laser beam (B). A beam splitter (16) divides the laser beam into two beams. One of the beams (B1) is directed along a reference path (P). This beam is reflected back along the path by a mirror (24) positioned at the end of the path. The other laser beam (B2) is directed at an object (T) to be identified as a friend or foe. This second beam reflects off the object and the return, reflected beam is detected. The reflected beam includes a vibration signature of the object under investigation. The return beam and reference beam are processed together to correct the vibration signature of the object for arty distortions. This allows an accurate target signature to be obtained. Next, the target signature is compared against other signatures. The results of the comparison provide the IFF identification.

20 Claims, 1 Drawing Sheet

LASER VIBROMETER IDENTIFICATION FRIEND-OR-FOE (IFF) SYSTEM

BACKGROUND OF THE INVENTION

This invention relates to identification friend-or-foe (IFF) systems and, more particularly, to a laser vibrometer IFF system.

As is well-known, laser beams have a high spatial and temporal coherence. One advantage of this is that it allows them to be used for very sensitive range measurements. This is done using interferometry principles. Using certain interferometric techniques, it is now possible to very precisely measure the velocity profile, for example, of air molecules around a ship's hull.

Recent advances in the development of compact, solid state lasers have made the use of velocimeters such as noted above quite practical for use in a number of applications. In the military area, one application heretofore not considered is the use of a laser based velocimeter to measure the vibration signature of different vehicles. As a practical matter, it would be advantageous to be able to identify a vehicle, plane, ship, or other object as being either a friend or an enemy using this technique. The advantage would lie in being able to establish a vibration signature for each thing likely to be encountered in a combat environment. If the signatures of all objects cannot be ascertained, certainly those of friendly forces can be. Thereafter, when an object is to be queried to determine its status, it vibration signature is first obtained. This is then compared against all available signatures. If the signature matches a known friendly signature, the object is treated accordingly. If the signature matches that for a foe, appropriate steps to neutralize the threat it represents can be taken. If there is no match, it indicates that other identification measures should be undertaken.

In addition to the ability to readily identify objects, another advantage of such a system would be its covertness. Since the querying platform both interrogates the target and evaluates the response, and because there is nothing required of the target to obtain its response, the target, if friendly, does not expose itself by transmitting a response message to a received query. Thus, the system allows the target to be totally passive, or non-cooperative.

SUMMARY OF THE INVENTION

Among the several objects of the present invention may be noted the provision of a system for identifying friends and foes in a combat environment; the provision of such system to employ a laser vibrometer; the provision of such a system to employ interferometric techniques to obtain the vibration signature of a target object; the provision of such a system to be a non-cooperative system in which the target is totally passive when being investigated to determine its identify; the provision of such a system to have a library of stored vibration signatures against which the target's signature can be compared; the provision of such a system for readily ascertaining if the object is a friend or foe based on the signature comparison; the provision of such a system to employ state-of-the-art interferometer techniques; the provision of such a system which utilizes of-the-shelf components; and, the provision of such a system which is a relatively low in cost, easy to use, fast in operation, and with which a user is readily trained.

In accordance with the invention, generally stated, a friend-or-foe (IFF) identification system comprises a laser generator for generating and transmitting a laser beam. A beam splitter divides the laser beam into two beams. One of the beams is directed along a reference path. This beam is reflected back along the path by a known target positioned at the end of the path. The other laser beam is directed at the object to be identified as a friend or foe. This second beam reflects off the object and the return, reflected beam is detected. The reflected beam includes a vibration signature of the object under investigation. The return beam and reference beam are processed together to correct the vibration signature of the object for any distortions. This allows an accurate target signature to be obtained. Next, the target signature is compared against other signatures. The results of the comparison provide the IFF identification. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
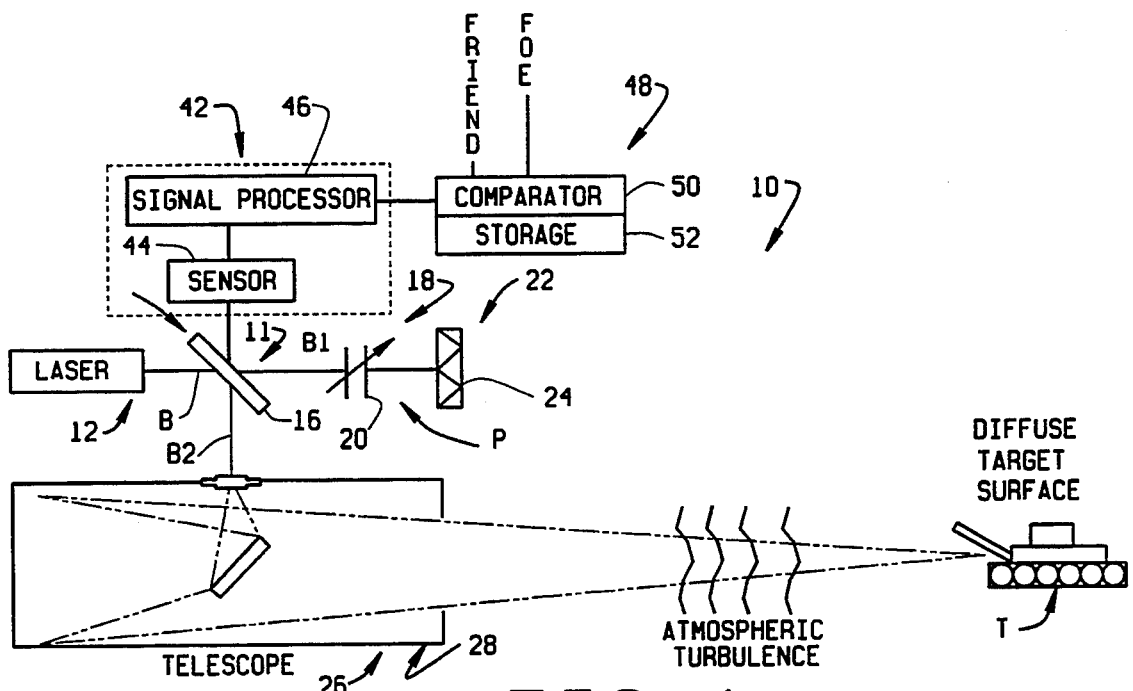
FIG. 1 is a schematic representation of the identification friend-or-foe system of the present invention.

Referring to the drawings, a friend-or-foe (IFF) identification system of the present invention is indicated generally 10. System 10 is for use in a battlefield environment to obtain information from a non-cooperative or passive target T. The information obtained is a vibration signature of the target. Each object, whether ground vehicle, aircraft, or ship has a unique vibration signature. The system maintains a file of known signatures and compares the signature obtained from the target against those it has on file. If the signature matches that of a known friendly object, the target is identified as such. If it does not, the system either identifies the target as a foe against which appropriate action should be taken; or, it provides an indication that further steps to identify the target should be taken.

System 10 first includes a means 12 installed on a platform for generating and transmitting a laser beam B. The laser beam generated is in the near infrared (IR) portion of the light spectrum and preferably has a long coherence length. A beam splitting means 14 includes a beam splitter 16 for dividing the laser beam into a first laser beam B1 and a second laser beam B2.

Laser beam B1 is directed along a first and reference path P. This path is intended to approximate the length between the platform and the target. For this purpose, an attenuation means 18 is interposed between the beginning and the end of the path. Means 18 includes a variable attenuator 20 whose attenuation is a function of the approximate distance between the platform and target. A mirror means 22 is located at the end of path P. The mirror includes a deformable mirror 24. The contour of the mirror is variable as a function of the perceived target surface diffusion of an incident laser beam. The effect of the attenuator and mirror in path P is to establish a reference pattern for the target.

Next, a means 26 is provided for directing second laser beam B2 at target T. Means 26 includes a telescope 28 and a means 30 for properly positioning the telescope so beam B2 is directed at the target. An advantage with using telescope 30 is to increase system sensitivity particularly at longer target distances. Means 30 includes an electronics unit 32 and gyroscopic unit 34 for moving the telescope in azimuth and elevation to direct the beam at the target. Electronics unit 32 includes both a power supply 36 and a amplifier section 38 which operates a gimballing system 40 for the telescope.

The laser beam B2, when it strikes the target, is directed back to the platform and this reflected beam is received back at the platform through the telescope. As the beam travels to and from the target, it is subject to atmospheric turbulence or disturbances which tend to disperse the laser beam. (For a discussion of atmospheric turbulence and its effect on laser beam transmission, please refer to *Laser Communication Systems*, W. K. Pratt, Wiley, 1969, pp. 132–133.) In addition, when the beam strikes the target, it is diffused or dispersed by the target geometry, the material with which the target is made, etc. Consequently, the characteristics of beam B2 are effected.

System 10 includes a processing means 42 for processing together both the reflected, return beam from target T, and reference beam B1. For this purpose, means 42 first includes a sensor 44 which converts the optical characteristics of the laser beams into corresponding electrical signals. These signals are routed to a signal processor 46 which processes the signals. The function of processor 46 is to correct the vibration signature of the object, as represented by the reflected beam B2, for any of the distortions noted above. Processor 46 measures the phase difference between the reference beam and that of the reflected beam in order to establish a vibration signature of the target. Thus, the phase characteristics of the reference beam are used to account for atmospheric turbulence, and target surface diffusion effects on the reflected beam. As a result, the output of the processing means is to obtain an accurate target signature.

After the signal processing is complete, an output target signature signal is routed to a comparing means 48. Means 48 includes a comparator 50 for comparing the target signature with the signatures of other known objects. A storage means 52 stores these signatures. Comparator 50 looks at the characteristics of the target signature with those in the storage means. If a match is found, an indication is provided as to whether the target is friendly, or not. If a match is not found, the system can be programmed to either identify the target as a foe, or direct that other inquiries be made to determine its identity.

Figure 2:
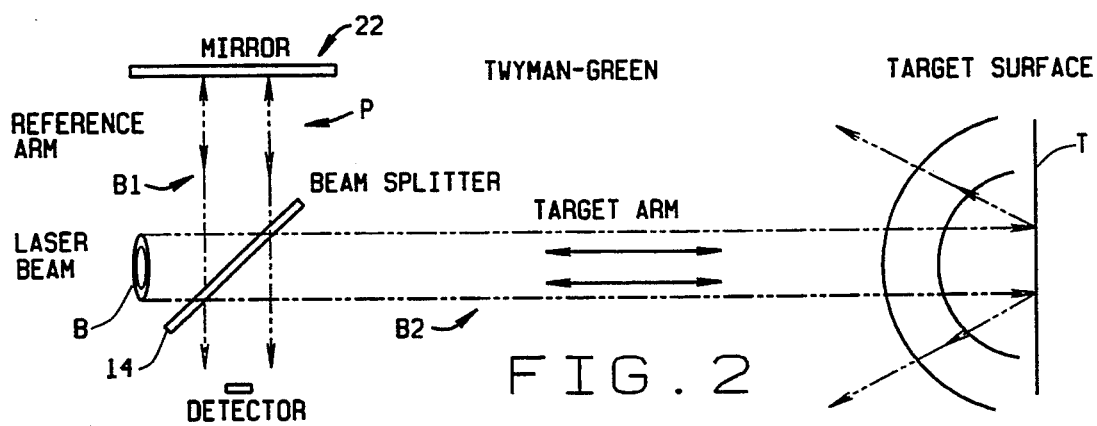
FIG. 2 is an illustration of a Twyman-Green interferometer.
Figure 3:
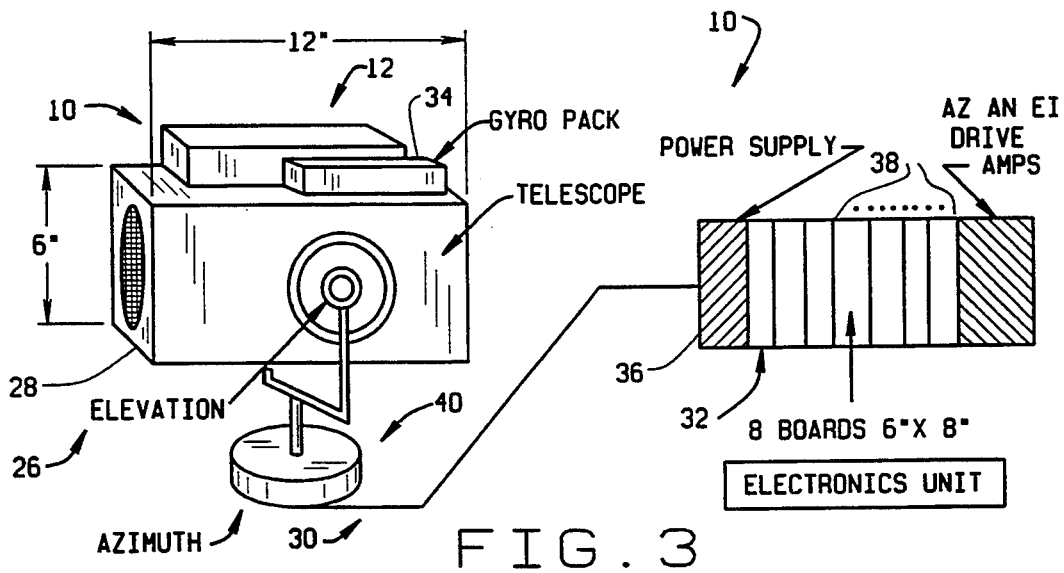
FIG. 3 is an illustration of a portion of the system.

Referring to FIG. 2, a Twyman-Green interferometer technique is illustrated. This technique is adaptable for use in system 10 to perform the method involved in practicing the invention.

What has been described is a low cost, simple, easy to use system which may be employed with a wide variety of weapons systems to enable a user to quickly and accurately identify whether a suspect target is friendly. This, despite smoke, dust, and other conditions encountered on the battlefield. In addition, operation of the system does not require the co-operation of the target which, if friendly, remains totally passive throughout the inquiry and therefore does not unnecessarily expose itself to an enemy.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A friend-or-foe (IFF) identification system to identify a passive target as a friend or foe comprising:
   means installed on a platform for generating and transmitting a laser beam;
   beam splitting means for dividing the laser beam into a plurality of beams;
   means defining a first and a reference path along which a first of the laser beams comprising a reference beam is directed, said reference laser beam being reflected back along said reference path by a reflector positioned at the end thereof;
   means for directing a second of the laser beams at said target to be identified as a friend or foe and for receiving a return beam reflected off the target, said target having existing vibrations therewithin prior to and while said second laser beam reflects off the target, said existing vibrations of said target constituting a vibration signature unique to the target under investigation, said reflected beam including said vibration signature unique to said target;
   means for processing said return beam and said reference beam to correct the vibration signature of the target for any distortions and thereby obtain an accurate target signature, said processing means including means for measuring the phase difference between said reference beam and said reflected beam thereby to establish the vibration signature of the target, the phase characteristics of the reference beam being used to account for atmospheric conditions such as turbulence and target surface diffusion effects on said reflected beam; and,
   means for comparing the target vibration signature against other vibration signatures, the results of the comparison providing the IFF identification.

2. The system of claim 1 wherein the beam generating means generates a long coherence length laser beam in the infrared portion of the light spectrum.

3. The system of claim 1 wherein said reference path defining means includes mirror means at the end thereof for reflecting said reference laser beam.

4. The system of claim 3 wherein said mirror means includes a deformable mirror.

5. The system of claim 4 wherein said reference path defining means further includes attenuator means interposed in the path to attenuate the reference beam as it travels along the path.

6. The system of claim 5 wherein the attenuation means is a variable attenuation means which is adjustable for the reference path to approximate the distance between the platform and the target.

7. The system of claim 1 wherein the directing means includes telescopic means for increasing system sensitivity.

8. The system of claim 7 wherein the telescopic means includes a telescope and means for positioning the telescope for said second laser beam to be directed at said target and for said return beam to be received therefrom.

9. The system of claim 1 wherein said comparing means includes storage means for storing a plurality of known object signatures, and means for providing an indication of whether the target signature matches that of a friendly object, an unfriendly object, or neither.

10. The system of claim 1 using a Twyman-Green interferometer technique.

11. A friend-or-foe (IFF) identification system for identifying the status of a passive target comprising:
   a laser installed on a platform for generating and transmitting a laser beam, said laser including a beam splitter means for dividing the laser beam into a first beam and a second beam;
   a reference including a reference path along which said first beam is directed, said reference including an attenuator interposed therealong for the path length to approximate a distance between the platform and said target, and It mirror positioned at the end of the path for reflecting said first beam back along the path;
   means for directing said second laser beam at said target and for receiving a return beam reflected off said passive target, said target having existing vibrations therewithin prior to and while said second laser beam reflects off the target, said existing vibrations of said target constituting a vibration signature unique to the target, said return beam including said vibration signature of said target, and said return beam being effected by the atmosphere and the surface diffusion effects of the target;
   a processor for processing said return beam and said reference beam to correct the vibration signature of the target for any atmospheric and surface diffusion effects thereby obtain an accurate passive target signature; and
   a comparator for comparing the passive target signature against the signature of other objects, the results of the comparison providing the IFF identification.

12. The system of claim 11 wherein the directing means includes a telescope and means for positioning the telescope for said second beam to be directed at said target and said return beam received therefrom, said telescope increasing system sensitivity.

13. The system of claim 12 wherein said processor measures the phase difference the phase difference between said first beam and said reflected beam thereby to establish the vibration signature of the passive target, the phase characteristics of the reference beam being used to account for atmospheric turbulence, and target surface diffusion effects on said reflected beam.

14. The system of claim 13 wherein said comparator includes a device for storing a plurality of known passive target signatures, said comparator providing an indication of whether the target signature matches that of a friendly passive target, an unfriendly target, or neither.

15. The system of claim 11 using a Twyman-Green interferometer technique.

16. A method of non-cooperative target IFF identification comprising:
   generating and transmitting a laser beam;
   splitting said laser beam into a first beam and a second beam;
   directing said first beam along a reference path the length of which approximates the distance to said target, and reflecting said first beam back along the path when it reaches the end thereof;
   directing said second laser beam at said non-cooperative target and receiving a return beam reflected off the target, said target having existing vibrations therewithin prior to and while said second laser beam reflects off the target, said existing vibrations of said target constituting a vibration signature unique to the target, said return beam including said vibration signature of the target, and said return beam being effected by the atmosphere and/or the surface diffusion effects of the target;
   processing said return beam and said reference beam together to correct the vibration signature of the target for any atmospheric and/or surface diffusion effects thereby to obtain an accurate target vibration signature; and
   comparing said target vibration signature against known vibration signatures of other targets, the results of such comparison providing the IFF identification.

17. The method of claim 16 further including attenuating said first beam as it travels along said reference path thereby for the path length to approximate that to the target.

18. The method of claim 17 further including deforming said first beam at the end of said reference path, said deformation being a function of surface diffusion effects of the target.

19. The method of claim 16 further including storing the vibration signatures of various objects for comparison purposes.

20. The method of claim 16 wherein processing said return beam and said reference beam includes measuring the phase difference therebetween.

* * * * *